(12) United States Patent
Lantz

(10) Patent No.: US 10,653,273 B2
(45) Date of Patent: May 19, 2020

(54) CHARCOAL IGNITER AND COOKER HAVING A VENTURI AND METHODS OF USING SAME

(71) Applicant: Aron J. Lantz, Williamsport, PA (US)

(72) Inventor: Aron J. Lantz, Williamsport, PA (US)

(*) Notice: Subject to any disclaimer, the term of this patent is extended or adjusted under 35 U.S.C. 154(b) by 667 days.

(21) Appl. No.: 15/365,494

(22) Filed: Nov. 30, 2016

(65) Prior Publication Data
US 2017/0156546 A1 Jun. 8, 2017

Related U.S. Application Data

(60) Provisional application No. 62/261,857, filed on Dec. 2, 2015.

(51) Int. Cl.
*A47J 37/07* (2006.01)

(52) U.S. Cl.
CPC .......... *A47J 37/079* (2013.01); *A47J 37/0704* (2013.01); *A47J 37/0763* (2013.01)

(58) Field of Classification Search
CPC ............................ A47J 37/0763; A47J 37/079
See application file for complete search history.

(56) References Cited

U.S. PATENT DOCUMENTS

| | | | |
|---|---|---|---|
| 103,736 A * | 5/1870 | Gregory | A47J 37/0704 126/25 R |
| 3,865,052 A * | 2/1975 | Streets | A47J 37/079 126/25 B |
| 4,417,565 A | 11/1983 | Karpinia | |
| 4,867,050 A * | 9/1989 | Patenaude | A47J 37/0754 99/400 |

(Continued)

*Primary Examiner* — Avinash A Savani
*Assistant Examiner* — Deepak A Deean

(57) ABSTRACT

A charcoal igniter, including a removable upper section such that the removable upper section includes a first conical section having a distal end and a proximal end such that the proximal end of the first conical section includes a first conical section opening, a fire chamber having a distal end and a proximal end such that a grating is located adjacent to the distal end of the fire chamber and the distal end of the first conical section is located adjacent to the proximal end of the fire chamber, and at least one air flow introducer operatively connected to the grating and extending into the fire chamber and a portion of an amount of charcoal to be ignited; and a stationary lower section such that the removable upper section is retained within the stationary lower section and the removable upper section can be removed from the stationary lower section, wherein the stationary lower section includes a plurality of supporting legs, and a second conical section having a distal end and a proximal end such that the proximal end of the second conical section is located adjacent to the removable upper section and the distal end of the second conical section includes a second conical section opening, wherein the first and second conical openings have a diameter that is larger than a diameter of the fire chamber. In an alternative embodiment, an elongated chimney conduit is attached to the proximal end of the first conical section and positioned substantially vertically. Exhaust created in the fire chamber flows up through the chimney conduit and out of the second end creating an upward draft.

12 Claims, 12 Drawing Sheets

(56) References Cited

U.S. PATENT DOCUMENTS

| | | | | |
|---|---|---|---|---|
| 4,895,134 A | * | 1/1990 | Fielding | A47J 37/0704 |
| | | | | 126/243 |
| 4,909,237 A | | 3/1990 | Karpinia | |
| 5,168,860 A | * | 12/1992 | Kibourian | A47J 37/0754 |
| | | | | 126/15 A |
| 5,176,124 A | * | 1/1993 | Wrasse | A47J 37/0704 |
| | | | | 126/25 R |
| 5,469,835 A | | 11/1995 | Stephen et al. | |
| 5,791,331 A | * | 8/1998 | Stewart | A47J 37/0704 |
| | | | | 126/25 R |
| 6,827,076 B2 | * | 12/2004 | Crawford | A47J 37/0731 |
| | | | | 126/25 R |
| 8,800,542 B1 | * | 8/2014 | Kennington | F24B 15/005 |
| | | | | 126/25 B |
| 2007/0131216 A1 | * | 6/2007 | Le Breis | A47J 37/079 |
| | | | | 126/25 R |

* cited by examiner

CHARCOAL IGNITER AND COOKER HAVING A VENTURI AND METHODS OF USING SAME

CROSS-REFERENCE TO RELATED APPLICATION

The present application is a continuation-in-part application which claims benefit to Provisional Application No. 62/261,857, entitled "Charcoal Rocket", filed on Dec. 2, 2015. The application stated above is hereby incorporated by reference as if set forth in its entirety herein.

FIELD OF THE INVENTION

The present invention is generally related to a charcoal igniter and cooker that is constructed with a venturi, and more particularly to a charcoal igniter and cooker that is constructed with a venturi in order to more quickly and efficiently ignite the charcoal through the use of the venturi and then possibly use the igniter as a food cooker.

BACKGROUND OF THE INVENTION

Prior to the present invention, as set forth in general terms above and more specifically below, it is known, to employ various types of charcoal igniters. See for example, U.S. Pat. No. 4,417,565 by Karpinia, U.S. Pat. No. 4,909,237 by Karpinia, and U.S. Pat. No. 5,469,835 by Stephen et al. While these various charcoal igniters may have been generally satisfactory, there is nevertheless a need for a new and improved charcoal igniter that is constructed with a venturi in order to more quickly and efficiently ignite the charcoal through the use of the venturi and then possibly use the igniter as a food cooker.

It is a purpose of this invention to fulfill these and other needs in the charcoal igniter art in a manner more apparent to the skilled artisan once given the following disclosure.

BRIEF SUMMARY OF THE INVENTION

A first aspect of the present invention is a charcoal igniter, including a removable upper section such that the removable upper section includes a first conical section having a distal end and a proximal end such that the proximal end of the first conical section includes a first conical section opening, a fire chamber having a distal end and a proximal end such that a grating is located adjacent to the distal end of the fire chamber and the distal end of the first conical section is located adjacent to the proximal end of the fire chamber, and at least one air flow introducer operatively connected to the grating and extending into the fire chamber and a portion of an amount of charcoal to be ignited; and a stationary lower section such that the removable upper section is retained within the stationary lower section and the removable upper section can be removed from the stationary lower section, wherein the stationary lower section includes a plurality of supporting legs, and a second conical section having a distal end and a proximal end such that the proximal end of the second conical section is located adjacent to the removable upper section and the distal end of the second conical section includes a second conical section opening, wherein the first and second conical openings have a diameter that is larger than a diameter of the fire chamber.

In one embodiment of the first aspect of the present invention, the at least one air flow introducer is further comprised of at least one air flow riser having a distal end and a proximal end such that the proximal ends of the at least one air flow riser is operatively attached to the grating and the distal end of the at least one air flow riser includes an opening; and at least one air infusion pipe is operatively connected to the at least one air flow riser.

In another embodiment of the first aspect of the present invention, the at least one air infusion pipe is further comprised of at least one hole located along a length of the air infusion pipe.

In another embodiment of the first aspect of the present invention, the removable upper section is further comprised of at least one upper external air flow pipe having a distal end and a proximal end such that the proximal end of the at least one upper external air flow pipe is operatively attached to the removable upper section.

In another embodiment of the first aspect of the present invention, the stationary lower section is further comprised of at least one lower external air flow pipe having a distal end and a proximal end such that the distal end of the at least one lower external air flow pipe is operatively attached to the second conical section and the proximal end of the at least lower external air flow pipe is operatively connected to the distal end of the at least one upper external air flow pipe.

In another embodiment of the first aspect of the present invention, the removable upper section is comprised of at least one upper external airflow pipe with its proximate end entering the fire chamber mid-height and terminating in the atmosphere on the distal end.

In still another embodiment of the first aspect of the present invention, the lower stationary section is further comprised of an ignition port having a proximal end and a distal end such that the proximal end of the ignition port is located adjacent to the grating of the removable upper section and the distal end of the ignition port includes an ignition port cap.

In still another embodiment of the first aspect of the present invention is an extended chimney stack which rests above the conical opening atop the fire chamber area.

In still yet another embodiment of the first aspect of the present invention, the stationary lower section is further comprised of an upper leg support and a lower leg support, wherein the upper leg support and the lower leg support are operatively connected to the plurality of supporting legs.

In yet another embodiment of the stationary lower base section the lower stationary section has at least one brace or strut to hold an extended chimney stack section in place above the first conical section upward facing opening.

A second aspect of the present invention is a charcoal igniter and food cooker, including a removable upper section such that the removable upper section includes a first conical section having a distal end and a proximal end such that the proximal end of the first conical section includes a first conical section opening such that a first grating is located over the first conical section opening, a fire chamber having a proximal end and a distal end such that the distal end of the first conical section is located adjacent to the proximal end of the fire chamber and a second grating located at a distal end of the fire chamber, and at least one air flow introducer operatively connected to the second grating and extending into a portion of the charcoal to be ignited and the fire chamber; and a stationary lower section such that the removable upper section is retained within the stationary lower section and the removable upper section can be removed from the stationary lower section, wherein the stationary lower section includes a plurality of supporting legs, and a second conical section having a distal end and a proximal end such that the proximal end of the second conical section is located adjacent to the removable upper section and the distal end of the second conical section includes a second conical section opening, wherein the first and second conical openings have a diameter that is larger than a diameter of the fire chamber, such that the restricted end of the bottom conical section fits with a snug airtight connection while the fire chamber area in the removable part is resting upon it, joining the upper section and the lower section without leaking airflow.

In one embodiment of the second aspect of the present invention, the at least one air flow introducer is further comprised of at least one air flow riser having a distal end and a proximal end such that the proximal end of the at least one air flow riser is operatively attached to the grating and the distal end of the at least one air flow riser includes an opening and at least one air infusion pipe operatively connected to the at least one air flow riser.

In another embodiment of the second aspect of the present invention, the at least one air infusion pipe is further comprised of at least one hole located along a length of the air infusion pipe.

In another embodiment of the second aspect of the present invention, the removable upper section is further comprised of at least one upper external air flow pipe having a distal end and a proximal end such that the proximal end of the at least one upper external air low pipe is operatively attached to the removable upper section.

In even further embodiment of the second aspect of the present invention, the stationary lower section is further comprised of at least one lower external air flow pipe having a distal end and a proximal end such that the distal end of the at least one lower external air flow pipe is operatively attached to the second conical section and the proximal end of the at least one lower external air flow pipe is operatively connected to the distal end of the at least one upper external air flow pipe.

In still another embodiment of the second aspect of the present invention, the stationary lower section is further comprised of an ignition port having a proximal end and a distal end such that the proximal end of the ignition port is located adjacent to the second grating of the removable fire chamber referred to as the upper section, and the distal end of the ignition port includes an ignition port cap.

In yet another embodiment of the second aspect of the present invention, the stationary lower section is further comprised of an upper leg support and a lower leg support, wherein the upper leg support and the lower leg support are operatively connected to the plurality of supporting legs.

In yet still another embodiment of the second aspect of the present invention, the upper section contains at least one external airflow pipe with its proximate end terminating in the fire chamber area, and its distal end terminating in the atmosphere.

A third aspect of the present invention is a method of igniting charcoal using a charcoal igniter that includes a venturi, including the steps of; placing a removable upper section of a charcoal igniter into a stationary lower section such that the removable upper section includes a first conical section having a distal end and a proximal end such that the proximal end of the first conical section includes a first conical section opening, a fire chamber having a proximal end and a distal end such that the distal end of the first conical section is located adjacent to the proximal end of the fire chamber and a grating located at the distal end of the fire chamber, and at least one air flow introducer operatively connected to the grating and extending into a portion of the charcoal to be ignited and the fire chamber, and a stationary lower section of the charcoal igniter such that the removable upper section is retained within the stationary lower section and the removable upper section can be removed from the stationary lower section, wherein the stationary lower section includes a plurality of supporting legs, and a second conical section having a distal end and a proximal end such that the proximal end of the second conical section is located adjacent to the removable upper section and the distal end of the second conical section includes a second conical section opening, wherein the first and second conical openings have a diameter that is larger than the diameter of the fire chamber, inserting an amount of charcoal to be ignited within the fire chamber, igniting a lower portion of the amount of charcoal to be ignited, creating an updraft in the fire chamber and the at least one air flow introducer, wherein the fire chamber creates a restriction in an air flow which causes the air flow to accelerate through fire chamber and the at least one air flow introducer which allows the air to be distributed over substantially the entire amount of charcoal located within fire chamber thereby encouraging a complete ignition of the charcoal.

In one embodiment of the third aspect of the present invention, the igniting step is further comprised of the step of; removing an ignition port cap that is attached at a distal end of an ignition port such that a proximal end of the ignition port is located adjacent to the removable lower section, using an ignition lighting implement to insert a flame into a distal end of the ignition port in order to direct a flame to the amount of charcoal within the fire chamber and located at the proximal end of the ignition port.

In another embodiment of the third aspect of the present invention, the placing step is further comprised of the step of attaching at least one air infusion pipe to the at least one air flow introducer.

In still yet another embodiment of the third aspect of the present invention, the placing step is further comprised of the step of attaching to the removable upper section at least one upper external air flow pipe having a distal end and a proximal end such that the proximal end of the at least one upper external air flow pipe is operatively attached to the removable upper section.

In still another embodiment of the third aspect of the present invention, wherein the placing step is further comprised of the step of attaching to the stationary lower section at least one lower external air flow pipe having a distal end and a proximal end such that the distal end of the at least one lower external air flow pipe is operatively attached to the second conical section and the proximal end of the at least one lower external air flow pipe is operatively connected to the distal ends of the at least one upper external air flow pipe.

In an even still another embodiment of the third aspect of the present invention, the method is further comprised of the step of attaching a blower adjacent to the first conical section opening in order to provide increased air flow through the charcoal igniter.

In yet another embodiment of the third aspect of the present invention is attaching, temporarily, an extended chimney stack to add vertical length to the upper conical section to achieve a greater vertical air column for hot escaping gases and providing increased updraft.

The preferred charcoal igniter having a venturi effect, according to various embodiments of the present invention, offers the following advantages: ease of use of the charcoal igniter; excellent charcoal ignition capabilities; the ability to use the charcoal igniter as a food cooker; the ability to provide air substantially throughout the entire amount of charcoal in the igniter; lightness in weight; excellent durability; portability; and reduced cost. In fact, in many of the preferred embodiments, these advantages are optimized to an extent that is considerably higher than heretofore achieved in prior, known charcoal igniters.

BRIEF DESCRIPTION OF THE DRAWINGS

The above-mentioned features and steps of the invention and the manner of attaining them will become apparent, and the invention itself will be best understood by reference to the following description of the embodiments of the invention in conjunction with the accompanying drawings, wherein like characters represent like parts throughout the several views and in which.

DETAILED DESCRIPTION OF THE PREFERRED EMBODIMENTS OF THE INVENTION

Figure 1:
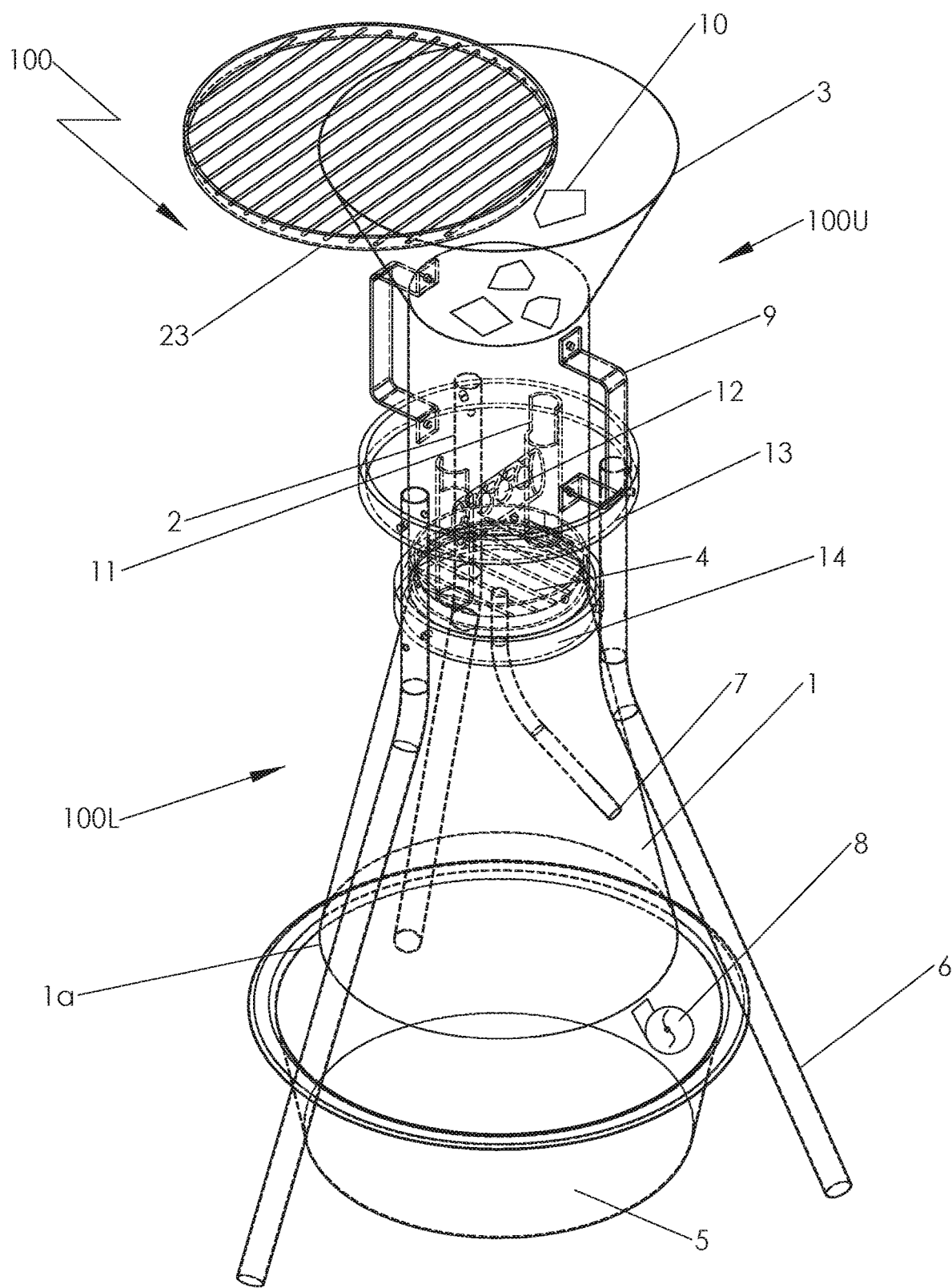
FIG. 1 is a schematic illustration of a charcoal igniter having a venturi, constructed according to the present invention.

Referring now to FIG. 1, there is illustrated a charcoal igniter 100 that is constructed with a venturi. As will be explained hereinafter in greater detail, the charcoal igniter 100 uses a venturi in order to more efficiently and quickly ignite the charcoal 10. Also, the charcoal igniter 100 can possibly be used as a food cooker, as will discussed in greater detail later.

Figure 2:
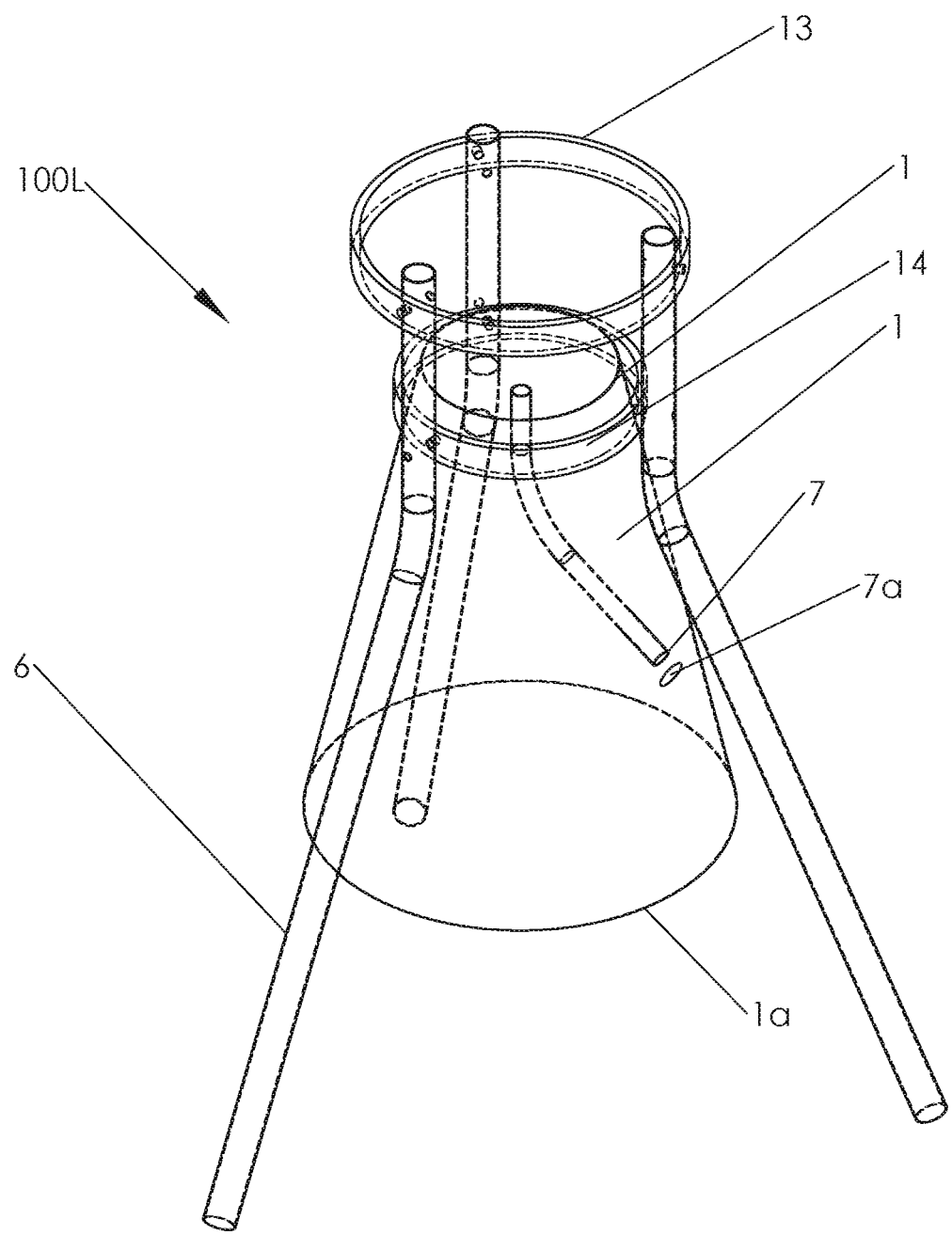
FIG. 2 is a schematic illustration of the lower section of the charcoal igniter, with the upper section removed, constructed according to the present invention.

Referring now more particularly to FIG. 1, charcoal igniter 100, includes, in part, upper section 100U and lower section 100L. With respect to lower section 100L, as shown in FIG. 2, lower section 100L includes, in part, accelerator section 1, opening 1a, ash collection pan 5 (FIG. 1), a plurality of support legs 6, igniter port 7, igniter port cap 7a, upper leg support 13, and lower leg support 14. It is to be understood that the various components of lower section 100L can be constructed of any suitable, durable material such as aluminum, steel or stainless steel. It is to be further understood that an optional blower 8 or other suitable device can be used to provide increased air flow through the opening 1a of accelerator section 1.

With respect to accelerator section 1, accelerator section 1 is conventionally attached to lower leg support 14 by conventional fasteners. Also, support legs 6 are also conventionally attached to lower leg support 14 and upper leg support 13 by conventional fasteners. As shown in FIG. 1, accelerator section 1 includes an opening 1a. It is to be understood that this opening 1a must be bigger in diameter (or cross-section) than the diameter (or cross-section) of the fire chamber 2 in order to provide the proper venturi effect in charcoal igniter 100. It is to be further understood that the dimensions and distance between upper leg support 13 and lower leg support 14 should be such that upper section 100U is able to be removably retained within lower section 100L and still allow the charcoal 10 located within fire chamber 2 to be properly ignited.

Regarding ash collection pan 5, preferably, ash collection pan 5 is any suitable collection pan that is capable of collecting any ashes and/or hot pieces of ignited charcoal that may fall down from fire chamber 2.

With respect to the plurality of support legs 6, support legs 6 allow charcoal igniter 100 to be longer and thus create better air flow through charcoal igniter 100. Also, support legs 6 allow the use of ash collection pan 5 to be located below lower section 100L. It is to be understood that the number of support legs 6 can vary with the important consideration being that the support legs 6 must provide adequate stability for charcoal igniter 100.

With respect to igniter port 7, as will be discussed in greater detail later, igniter port 7 is attached to accelerator section 1 by conventional techniques such as welding or using conventional fasteners. In this manner, igniter port 7 allows the user to insert a flame from a conventional lighting implement such as a torch or other similar device in order to provide a flame to the charcoal 10 located at the other end of the igniter port 7 which is located within the upper end of the accelerator section 1 and adjacent to lower grate 4, as shown in FIG. 2. FIG. 2 shows the bent pipe suspended directly under the lower grate and the charcoal to be ignited in the bottom of the fire chamber area. It is to be understood that igniter port 7 could also be attached to fire chamber 2 and enter through the sidewall of the fire chamber area (not shown in this configuration). The igniter port cap 7a is used to prevent any contaminants or other unwanted debris from entering into igniter port 7 when the charcoal igniter 100 is not in use by simply placing igniter port cap 7a over the open end of igniter port 7 located adjacent to accelerator section 1. Also, igniter port cap 7a is used to prevent any sparks or lit pieces of charcoal 10 from falling out of igniter port 7 after the charcoal igniter 100 has been lit. It is to be further understood that the length of igniter port 7 should be such that the flame from the conventional lighting implement is able to reach the charcoal 10 located within fire chamber 2 but at the same time keep the user from getting too close to the charcoal 10 that is being ignited.

Figure 3:
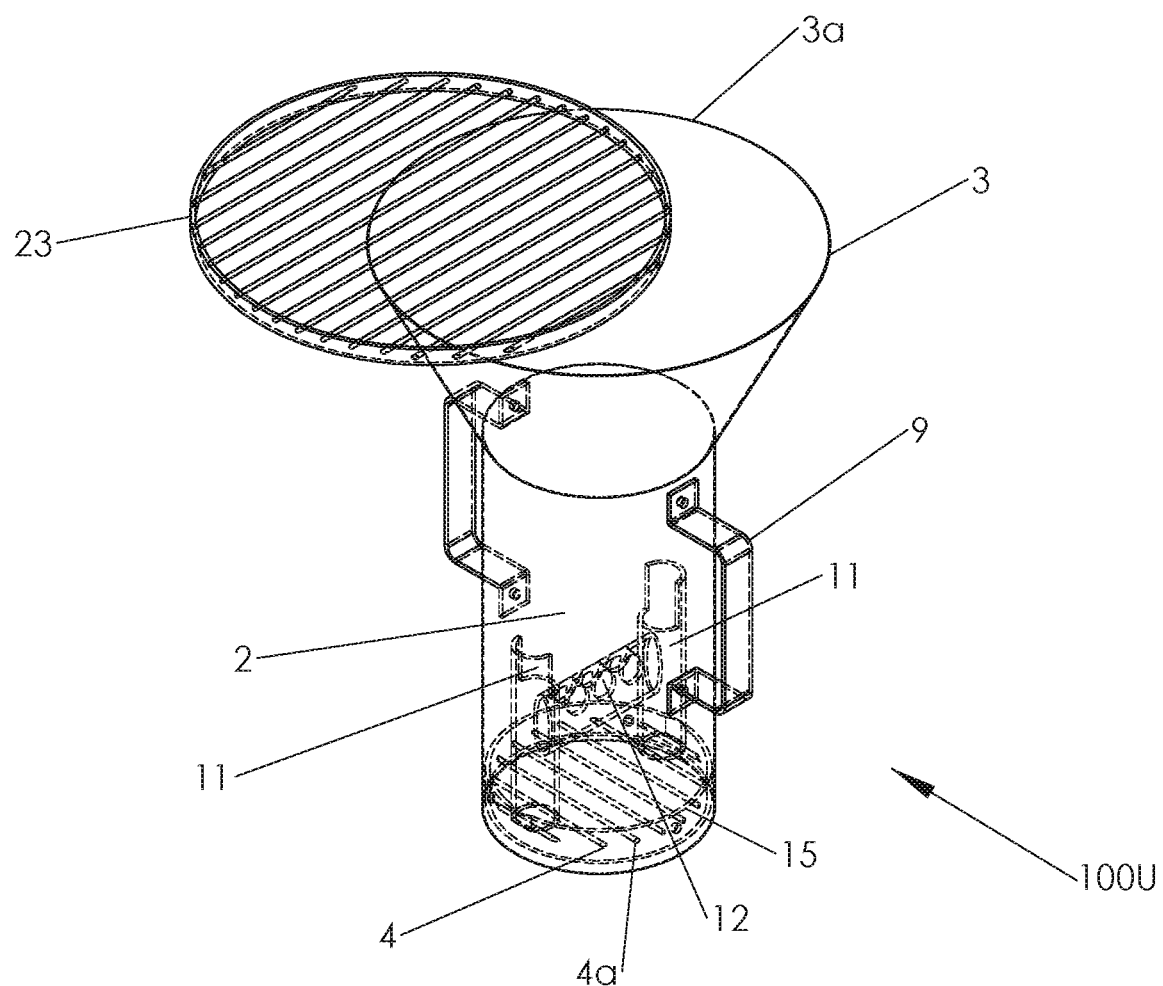
FIG. 3 is a schematic illustration of the upper section of the charcoal igniter, constructed according to the present invention.

With respect to upper section 100U, as shown in FIG. 3, upper section 100U includes, in part, fire chamber area 2, conical top section 3, opening 3a, lower grate 4, a plurality of handles 9, at least one air flow riser 11, air infusion pipe 12, grate support and attachment ring 15 and optional cooking grate 23. It is to be understood that the various components of upper section 100U can be constructed of any suitable, durable material such as aluminum, steel or stainless steel. It is to be further understood that fire chamber 2 should be constructed of any suitable, durable, high heat resistant material that will not melt or burn such as steel, stainless steel or ceramic.

With respect to fire chamber area 2, as will be discussed in greater detail later, fire chamber 2 is used to hold the charcoal 10 (FIG. 1) so that the charcoal 10 can be ignited. It is to be understood that the dimensions of fire chamber area 2 should be such that a sufficient amount of charcoal 10 can be retained within fire chamber 2 in order to provide a suitable amount of ignited charcoal to the user.

With respect to conical top section 3, top section 3 is preferably shaped in the form of a cone in order to assist in providing the venturi effect to charcoal igniter 100, as will be discussed in greater detail later. It is to be understood that the dimensions of conical top section 3 should be such that a sufficient venturi effect can be achieved in charcoal igniter 100. As discussed above, it is to be understood that the opening 3a in conical top section 3 must be larger in diameter (or cross-section) than the diameter (or cross-section) of fire chamber 2 in order to provide the proper venturi effect in charcoal igniter 100. It is to be further understood that accelerator section 1, conical top section 3 and fire chamber 2 are shown as being circular but other geometric shapes for the cross-section can be used.

With respect to lower grate 4, lower grate 4 is used in conjunction with fire chamber 2 in order to retain the charcoal 10 (FIG. 1) within fire chamber 2. Lower grate 4, includes, in part, a plurality of bars 4a that are spaced apart from each other in order to allow air to flow through the lower grate 4 and into fire chamber 2. It is to be understood that the dimensions and the configurations of the plurality of bars 4a with respect to each other can be varied as long as air is able to properly flow through lower grate 4 and into fire chamber 2.

With respect to handles 9, preferably, handles 9 are conventionally attached to the sides of fire chamber 2 by conventional fasteners. It is to be understood that the size and shape of handles 9 should be such that the user is able to easily dump the ignited charcoal from the upper section 100U without the user's hands becoming too hot due to being exposed to the ignited charcoal in the fire chamber 2.

Figure 4:
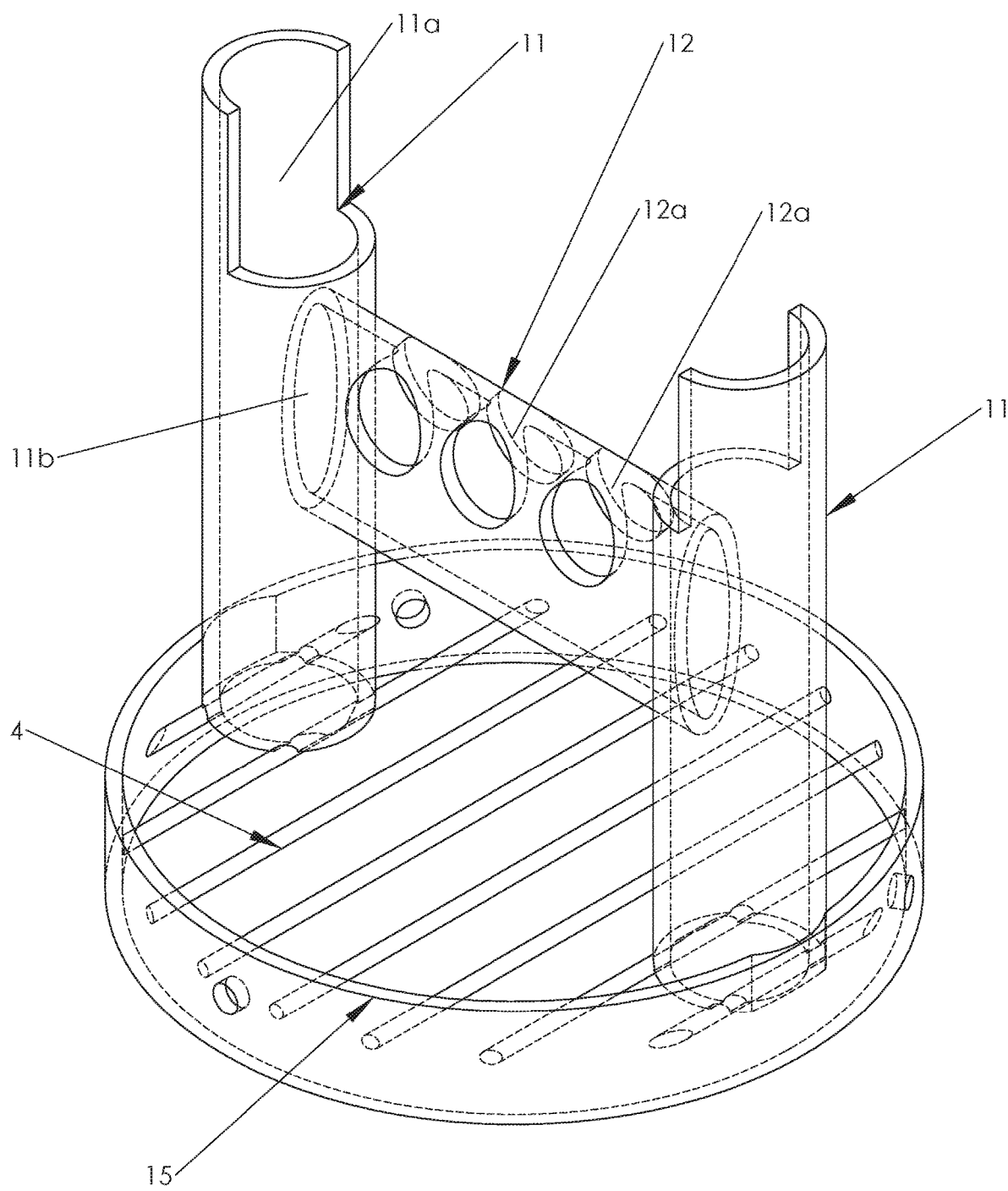
FIG. 4 is a cut-away view of the upper section of the charcoal igniter, showing the internal air flow risers and the fire infusion pipe, constructed according to the present invention.

With reference now to FIGS. 3 and 4, the plurality of air flow risers 11 and air infusion pipe 12 will now be discussed. Preferably, air flow risers 11 are conventionally attached to lower grate 4 and grate support and attachment ring 15 by conventional techniques such as welding. As will be discussed in greater detail later, air flow risers 11 allow air to flow past lower grate 4, out of openings 11a and into an upper portion of the charcoal 10 that is located within fire chamber 2. It is to be understood that the dimensions of air flow risers 11 should be such that an adequate amount of air will be able to be introduced into the upper portion of the charcoal 10 located within fire chamber 2.

Regarding air infusion pipe 12, air infusion pipe 12 is conventionally attached to openings 11b in the plurality of air flow risers 11 by conventional techniques such as welding. As will be discussed in greater detail later, air infusion pipe 12 includes a plurality of holes 12a that interact with the openings 11b in air flow risers 11 to allow air to flow past lower grate 4 and into an upper portion of the charcoal 10 that is located within fire chamber 2. In this manner, air is able to be introduced into several different portions of the charcoal 10 to be ignited instead of merely igniting the charcoal 10 from the bottom of the charcoal 10, as has been the practice of the prior art. Also, the use of the air flow risers 11 and the air infusion pipe 12 allow more air to be added into the charcoal bed zone above the bottom burning bed zone of the charcoal 10. This is because as the bottom bed of charcoal 10 on the lower grate 4 burns first, the burning continues upwards to the upper layer of the charcoal 10. A unique aspect of the present invention is that the air flow risers 11 and the air infusion pipe 12 add airflow (more unused oxygen) directly to the hot gases rising off the lower bed of the charcoal 10, thereby adding a fresh charge of oxygen to the hot gases and fuel in the upper layers of charcoal 10 to help charcoal 10 ignite faster. It is to be understood that the dimensions of the air infusion pipe 12 and the number of openings 12a in air infusion pipe 12 should be such that an adequate amount of air will be able to be introduced into the upper portion of the charcoal 10 located within fire chamber 2.

With reference now to FIGS. 1-4, the operation and use of charcoal igniter 100 will now be discussed. Initially, the user determines the amount of charcoal 10 to be placed within fire chamber 2 through conical top section 3. Conical top section 3 acts as a funnel in order to assist the user in introducing the charcoal 10 into fire chamber 2. It is to be understood that while charcoal 10 is the preferred material to be used within charcoal igniter 100, dried chunks of wood or other suitable types of materials can be used as long as they provide adequate heating/cooking properties similar to charcoal. Once the amount of charcoal has been determined, the user can place upper section 100U on top of lower section 100L in order to add the charcoal to fire chamber 2. It is to be further understood that the user may simply add the charcoal to fire chamber 2 and then place upper section 100U onto lower section 100L.

After the upper section 100U has been placed on lower section 100L, the user simply removes ignition port cap 7a (FIG. 1) and applies a conventional ignition device such as a torch to the open end of ignition port 7 located adjacent to accelerator section 1. In this manner, the flame should travel up ignition port 7 and interact with the bottom of the portion of the charcoal 10 located in fire chamber 2 adjacent to the other end of ignition port 7 in order to ignite the lower portion of the charcoal 10.

Once the lower portion of the charcoal 10 has been sufficiently ignited, one of the unique aspects of the present invention comes into play. As the bottom of the charcoal 10 becomes ignited, the ignited charcoal 10 starts to draw air up through lower grate 4, air flow risers 11 and air infusion pipe 12. The drawing of the air into air flow risers 11 and air infusion pipe 12 allows air to be efficiently introduced into the middle and upper portions of the charcoal 10 located in fire chamber 2. It is to be understood that this concept is unique since this allows the entire amount of charcoal 10 to become completely ignited without having to wait for the bottom portion of the charcoal 10 to become ignited and then allowing the heat from the lower portion of the charcoal 10 to ignite subsequent upper portions of the charcoal 10. Since substantially the entire amount of the charcoal 10 is being ignited at the same time, the heat required to ignite the subsequent upper portions of the charcoal 10 is not being wasted.

In another unique aspect of the present invention, the different diameters of the accelerator section opening 1a and the conical top section opening 3a in conjunction with the fire chamber 2 create a venturi effect for the charcoal igniter 100. Also, due to the fact that accelerator opening 1a is larger in diameter than a diameter of fire chamber 2, air velocity at lower grating 4 is increased. Further, due to the fact that charcoal 10 further restricts the open passages in fire chamber 2, the air flow increases as the air goes through the charcoal 10 in the fire chamber 2 on its way up and out of conical tip section opening 3a. In this manner, the convective hot gases flowing upward create more airflow up through accelerator opening 1a. It is to be understood that due to the fact that the volume within accelerator section 1 is greater than the volume of fire chamber 2, a net increase in the velocity of the air that passes through fire chamber 2, lower grate 4, air flow risers 11, and air infusion pipe 12 is created when air begins to flow through charcoal igniter 100 once the charcoal 10 is ignited. As heat is created in fire chamber 2, an updraft is created within fire chamber 2, air flow risers 11, and air infusion pipe 12. The dimensions of fire chamber 2 create a restriction in the air flow which cause the air flow to accelerate even more through fire chamber 2, air flow risers 11, and air infusion pipe 12 which allows the air to be distributed over substantially the entire amount of charcoal 10 located within fire chamber 2 thereby encouraging a quicker and more efficient, complete ignition of the charcoal 10.

In a still another unique aspect of the present invention, as shown in FIG. 3, charcoal igniter 100 can be equipped with an optional upper cooking grate 23 that is placed over conical top section opening 3a after the upper section 100U is placed on top of the lower section 100L. Once the charcoal 10 has been ignited, the user can simply place the upper cooking grate 23 over conical top section opening 3a. In this manner, the user can then place a cooking implement such as a cooking pot or cooking pan (not shown) and use the heat being emitted from the ignited charcoal 10 in order to heat any food placed within the cooking implement. It is to be understood that the user can also place the food to be cooked on skewers or other similar types of cooking implements and simply cook the food directly over the upper cooking grate 23. In this manner, the upper cooking grate 23 will act as a retainer for assisting in the cooking of the food and a barrier to prevent unwanted sparks or other lit particles from the ignited charcoal from leaving the fire chamber 2 and inadvertently contacting the user or the food being cooked by the user.

Figure 5:
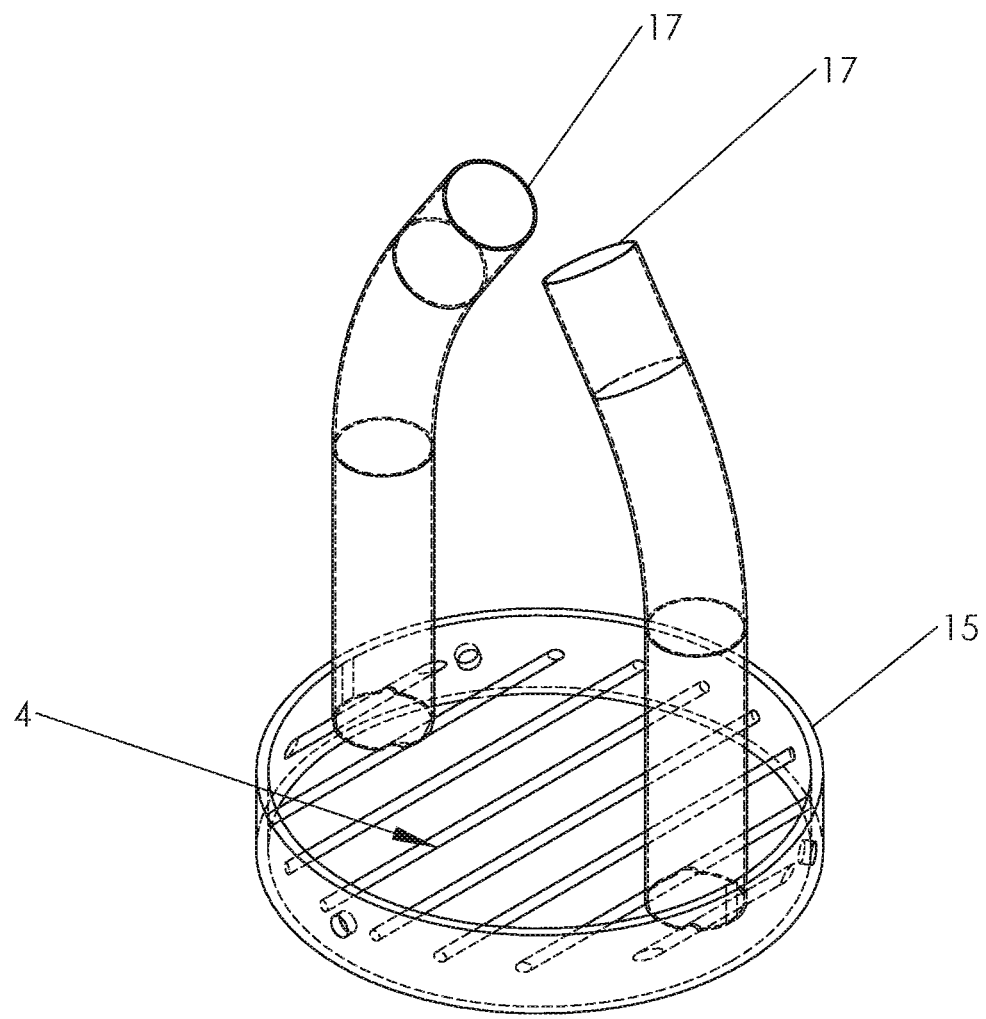
FIG. 5 is a cut-away view of the upper section of the charcoal igniter, showing another embodiment of the internal air flow risers, wherein the internal air flow risers are bending inwardly to infuse airflow into the mid-section of the fire chamber, constructed according to the present invention.

With respect to FIG. 5, there is illustrated another embodiment of the plurality of air flow risers 17. Preferably, air flow risers 17 are conventionally attached to lower grate 4 and grate support and attachment ring 15 by conventional techniques such as welding in a similar manner that air flow risers 11 are attached to lower grate 4 and grate support and attachment ring 15. As can be seen in FIG. 5, in this embodiment, air flow risers 17 are extended so that the air that flows up and through air flow risers 17 will interact with an upper and/or mid-portion of the charcoal 10 located within fire chamber 2. It is to be understood that the air flow risers 17 are constructed so as to angle towards one another at a location towards the upper and/or mid-portion of the charcoal 10 located within fire chamber 2. In this manner, the angling of the air flow risers 17 allows air to be efficiently introduced into the upper and/or mid-portion of the charcoal 10 located within fire chamber 2. It is to be further understood that the dimensions of air flow risers 17 should be such that an adequate amount of air will be able to be introduced into the upper and/or mid-portion portion of the charcoal 10 located within fire chamber 2.

Figure 6:
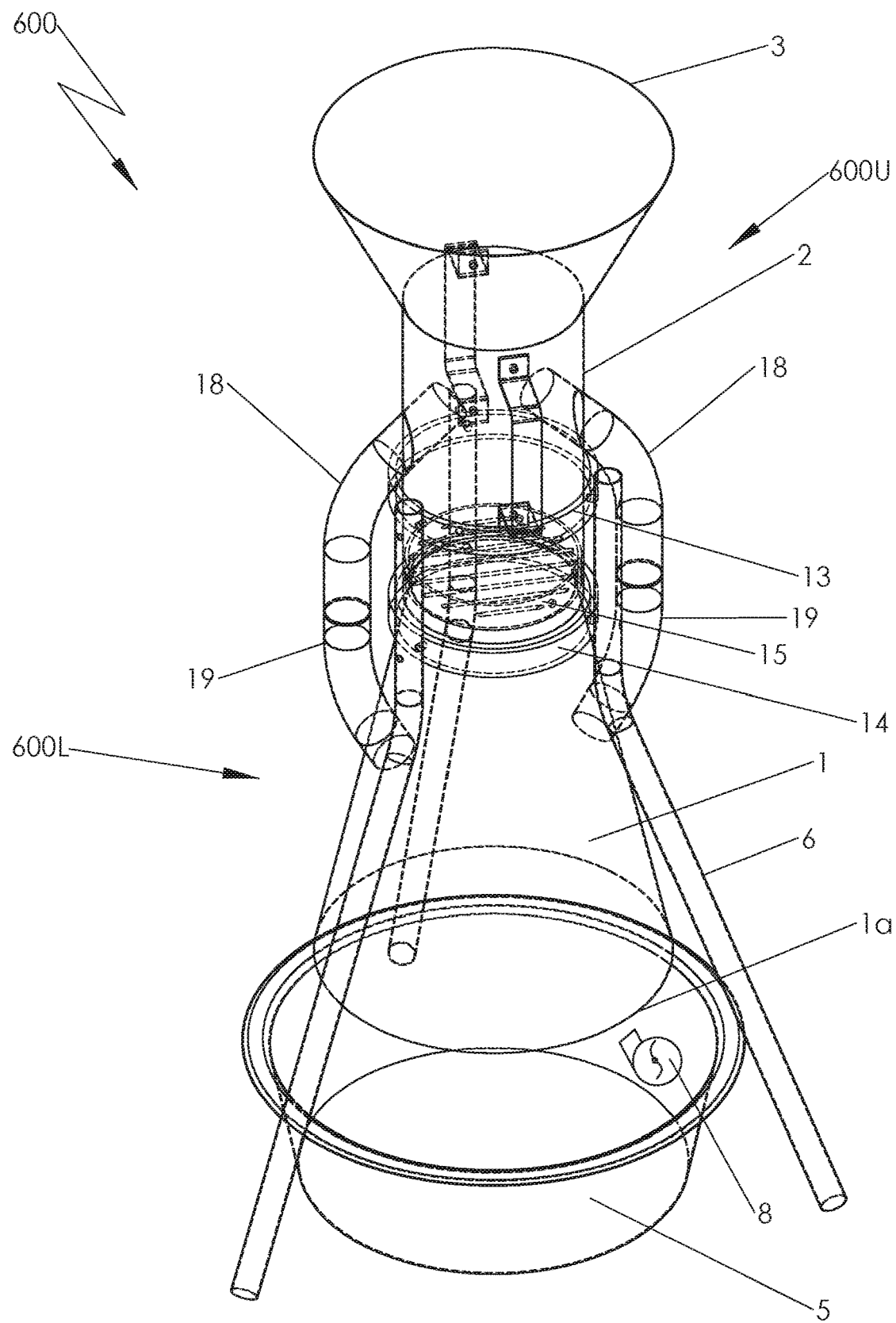
FIG. 6 is a schematic illustration of another embodiment of the charcoal igniter having a venturi, wherein this embodiment includes external air flow pipes, constructed according to the present invention.

Regarding FIG. 6, there is illustrated another embodiment of the charcoal igniter 600. The components of FIGS. 7 and 8 combine to achieve the embodiment shown in FIG. 6 Charcoal igniter 600, includes, in part, upper section 600U and lower section 600L. With respect to lower section 600L, as shown in FIG. 6, lower section 600L includes, in part, accelerator section 1, opening 1a, ash collection pan 5, a plurality of support legs 6, upper leg support 13, lower leg support 14, and lower external air flow pipes 19. It is to be understood that the various components of lower section 600L can be constructed of any suitable, durable material such as aluminum, steel or stainless steel. It is to be further understood that the fire chamber 2, as shown in FIG. 6, is constructed of the same materials as the fire chamber 2 illustrated in FIG. 1. It is to be even further understood that except for the use of the upper external airflow pipes 18 and lower external air flow pipes 19, as discussed below, charcoal igniter 600 is constructed in substantially the same manner as charcoal igniter 100 and operates in substantially the same manner as charcoal igniter 100 including igniter port 7 and igniter port cap 7a.

Figure 7:
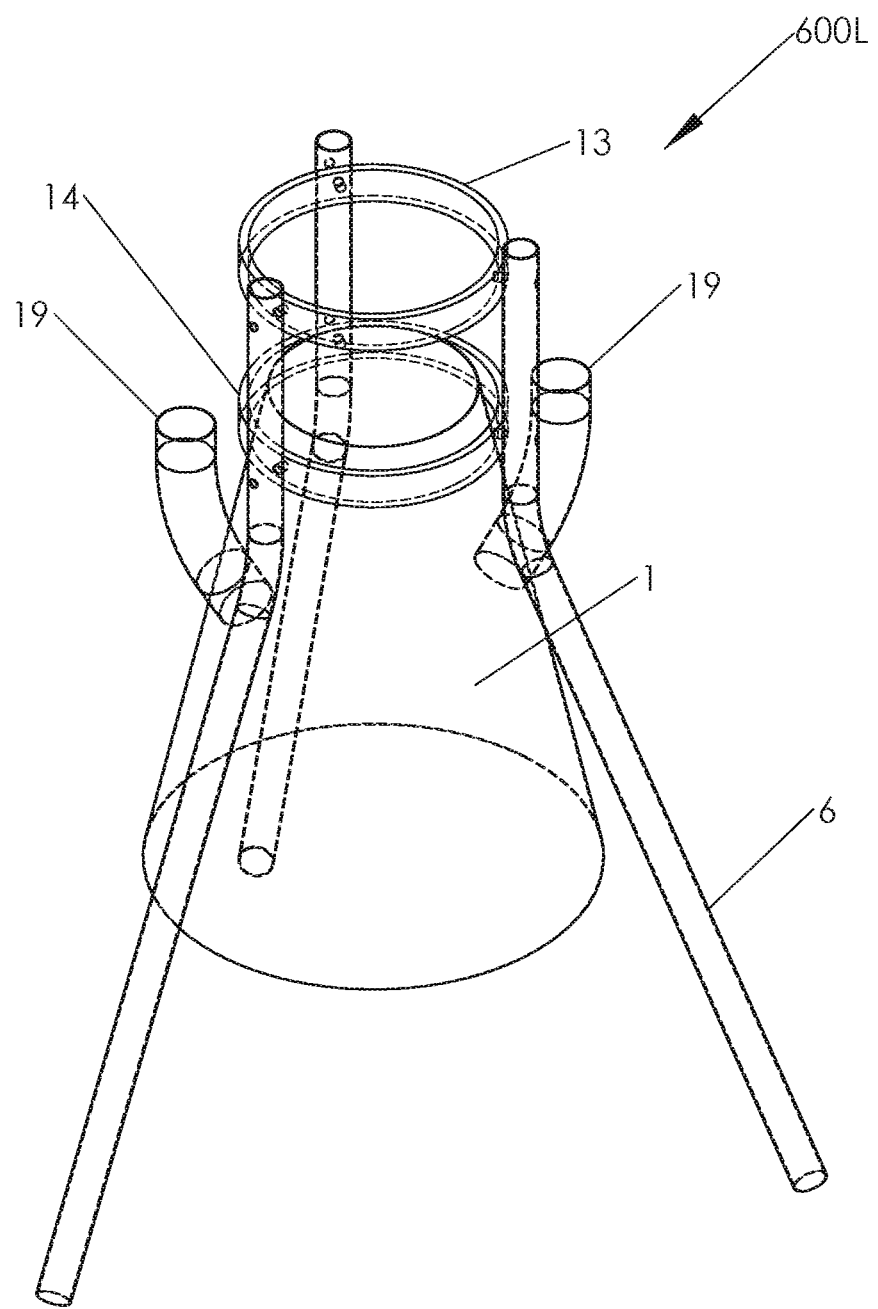
FIG. 7 is a schematic illustration of the lower section of the another embodiment of the charcoal igniter having a venturi, as shown in FIG. 6, wherein the external airflow pipes are attached to the accelerator section, constructed according to the present invention.

As can be seen in FIG. 7, lower external air flow pipes 19 are conventionally attached to openings in an upper section of accelerator section 1 by conventional techniques such as welding or through the use of conventional fasteners. It is to be understood that lower section 600L is constructed in substantially the same manner as lower section 100L of charcoal igniter 100 except for the addition of the lower external air flow pipes 19.

Figure 8:
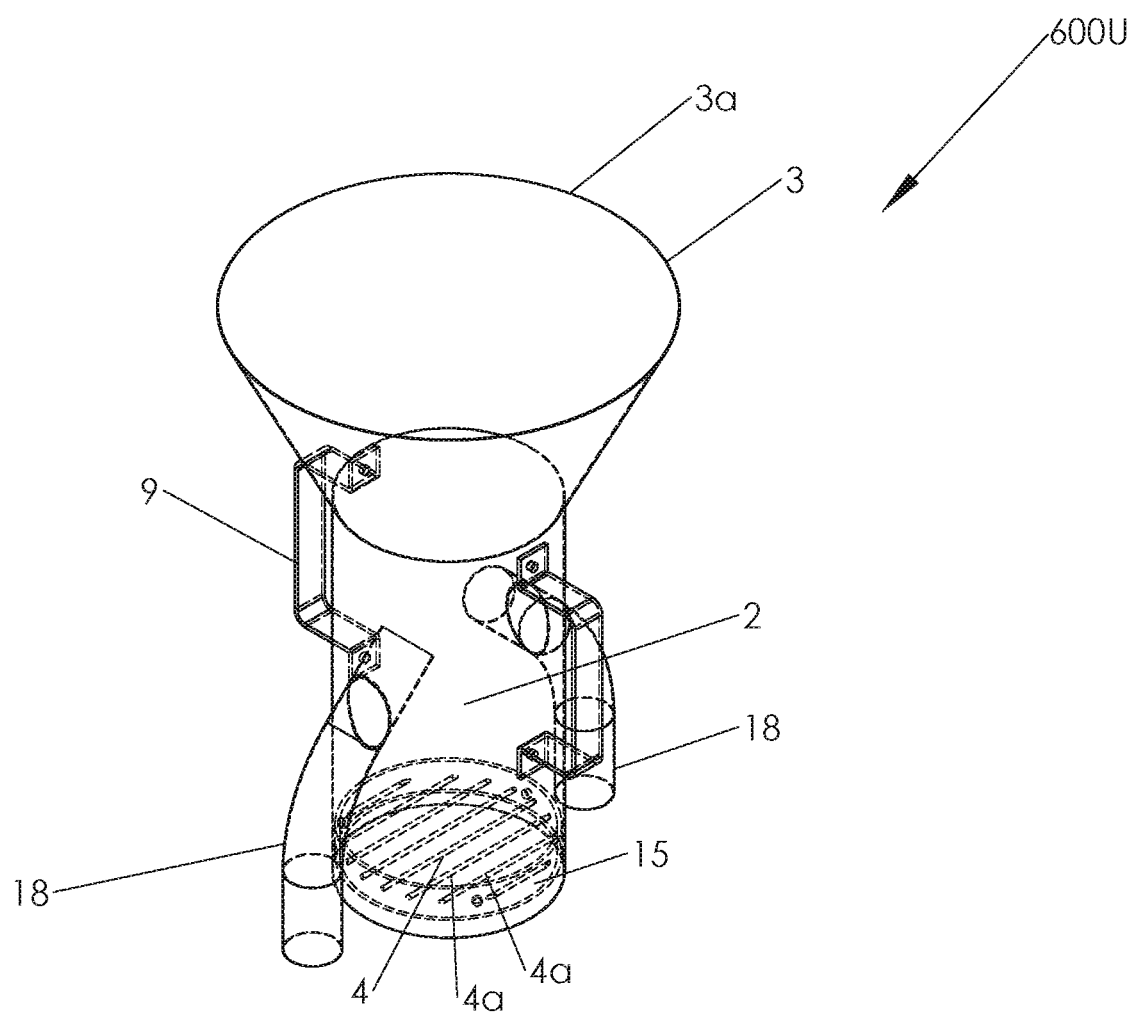
FIG. 8 is a schematic illustration of the upper section of the another embodiment of the charcoal igniter having a venturi, as shown in FIG. 6, constructed according to the present invention.

With respect to upper section 600U, upper section 600U includes upper external air flow pipes 18, as shown in FIGS. 6 and 8. Upper external air flow pipes 18 are conventionally attached to openings in a mid-portion of the fire chamber 2 by conventional techniques such as welding or through the use of conventional fasteners. It is to be further understood that the diameters of upper external air flow pipes 18 and lower external air flow pipes 19 should be substantially the same in order to provide proper air flow through upper external air flow pipes 18 and lower external air flow pipes 19. It is to be even further understood that in order to allow upper section 600U to be removed from lower section 600L, upper external air flow pipes 18 and lower external air flow pipes 19 should not be permanently connected together. Instead, the user merely aligns upper external air flow pipes 18 and lower external air flow pipes 19 in order to provide proper air flow through upper external air flow pipes 18 and lower external air flow pipes 19.

Figure 9:
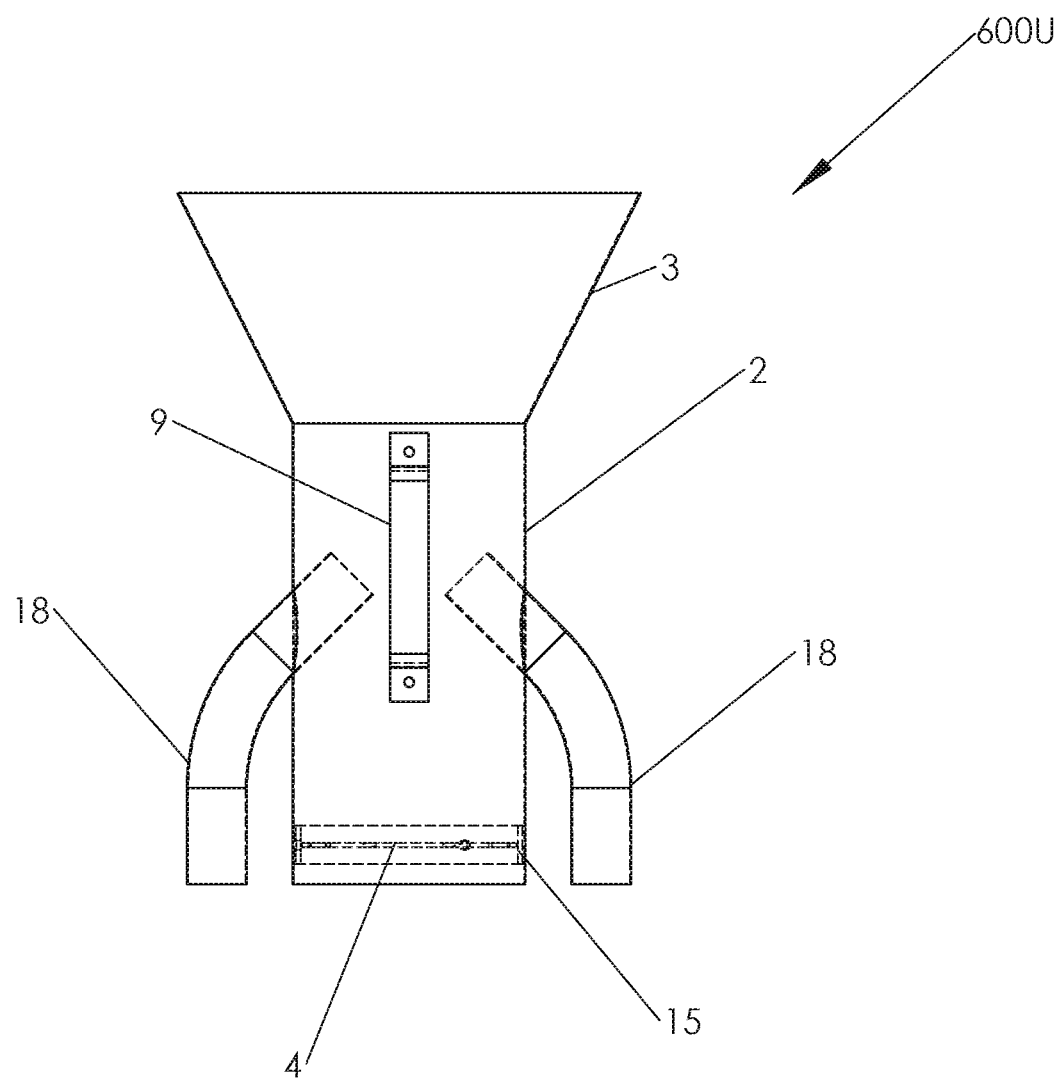
FIG. 9 is a side view of the upper section of the another embodiment of the charcoal igniter having a venturi, as shown in FIG. 8, constructed according to the present invention.

Regarding FIG. 9, there is illustrated a side view of the upper section 600U of charcoal igniter 600. As shown in FIG. 9, the upper external air flow pipes 18 extend into a mid-portion to upper portion of the fire chamber 2. In this manner, air is conducted through the lower external air flow pipes 19 (FIG. 6) and up through upper external air flow pipes 18 so that the air interacts with a mid-portion and/or an upper portion of the charcoal 10 in the fire chamber 2. It is to be further understood that the other unique aspects of the charcoal igniter 100 such as the venturi effect and the ability to use the charcoal igniter 100 as a food cooker/heater can equally be applied to charcoal igniter 600.

Figure 10:
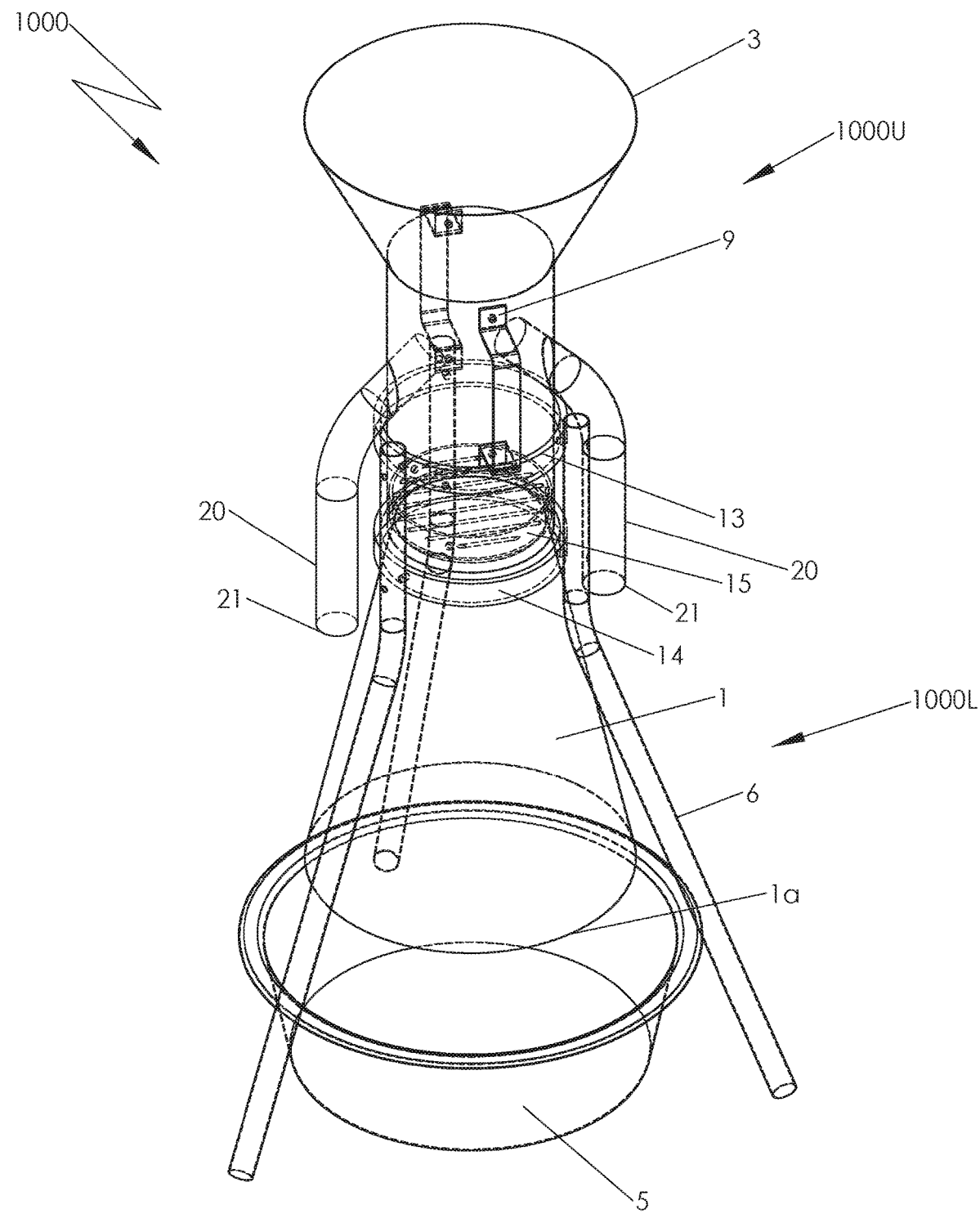
FIG. 10 is a schematic illustration of still another embodiment of the charcoal igniter having a venturi, wherein this embodiment includes another embodiment of the external air flow pipes with the distal ends of the external air flow pipes terminating in the atmosphere, constructed according to the present invention.

Regarding FIG. 10, there is illustrated another embodiment of the charcoal igniter 1000. Charcoal igniter 1000, includes, in part, upper section 1000U and lower section 1000L. With respect to lower section 1000L, as shown in FIG. 10, lower section 1000L includes, in part, accelerator section 1, opening 1*a*, ash collection pan 5, a plurality of support legs 6, upper leg support 13, and lower leg support 14. It is to be understood that the various components of lower section 1000L can be constructed of any suitable, durable material such as aluminum, steel or stainless steel. It is to be further understood that the fire chamber 2, as shown in FIG. 10, is constructed of the same materials as the fire chamber 2 illustrated in FIG. 1. It is to be even further understood that except for the use of the upper external airflow pipes 20 and closable plate 21, as discussed below, charcoal igniter 1000 is constructed in substantially the same manner as charcoal igniter 100 and operates in substantially the same manner as charcoal igniter 100 including igniter port 7 and igniter port cap 7*a*.

With respect to upper section 1000U, upper section 1000U includes upper external air flow pipes 20 and a closable plate 21. Upper external air flow pipes 20 are conventionally attached to openings in a mid-portion of the fire chamber 2 by conventional techniques such as welding or through the use of conventional fasteners. As can be seen in FIG. 10, upper external air flow pipes 20 terminate outside of the fire chamber 2. It is to be further understood that the diameters of upper external air flow pipes 20 should provide proper air flow through upper external air flow pipes 20.

It is to be further understood that closable plate 21 can be any suitable device that can be used to cover or close the end of upper external air flow pipes 20 in order to control (dampen) the amount of air that is introduced into the charcoal 10 located with fire chamber 2 through upper external air flow pipes 20. For example, when it is desired to use charcoal igniter 1000 as a food cooker/heater, as previously discussed with respect to charcoal igniters 100 and 600, air flow in the upper external air flow pipes 20 is conventionally regulated (dampened) through the use of closable plate 21. In addition, the air flow in accelerator section 1 may be conventionally regulated (dampened) through the use of a closable plate (not shown).

Regarding FIG. 10, the upper external air flow pipes 20 extend into a mid-portion to an upper portion of the fire chamber 2. In this manner, air is conducted through the upper external air flow pipes 20 so that the air interacts with a mid-portion and/or an upper portion of the charcoal 10 in the fire chamber 2. In addition, due to the fact that external airflow pipes 20 terminate in the atmosphere and extend downwardly, external airflow pipes 20 create their own updraft and draw in cooler, more dense air while not disrupting airflow in the accelerator section 1. It is to be further understood that the other unique aspects of the charcoal igniters 100 and 600 such as the venturi effect and the ability to use the charcoal igniters 100 and 600 as a food cooker/heater can equally be applied to charcoal igniter 1000.

In particular, due to the fact that the volume within accelerator section 1 is greater than the volume of fire chamber 2, a net increase in the velocity of the air that passes through lower grate 4, fire chamber 2 and upper external air flow pipes 20 is created when air begins to flow through charcoal igniter 1000 once the charcoal 10 is ignited. Also, due to the fact that accelerator opening 1*a* is larger in diameter (or cross-section) than a diameter (or cross-section) of fire chamber 2, air velocity at lower grating 4 is increased. Further, due to the fact that charcoal 10 further restricts the open passages in fire chamber 2, the air flow increases as the air goes through the charcoal 10 in the fire chamber 2 on its way up and out of conical tip section opening 3*a*. In this manner, the convective hot gases flowing upward create more airflow up through accelerator opening 1*a*. As heat is created in fire chamber 2, an updraft is created within fire chamber 2 and upper external air flow pipes 20. The dimensions and location of fire chamber 2 create a restriction in the air flow which cause the air flow to accelerate even more through fire chamber 2 and upper external air flow pipes 20 which allows the air to be distributed over substantially the entire amount of charcoal 10 located within fire chamber 2 thereby encouraging a quicker and more efficient complete ignition of the charcoal 10.

Figure 11:
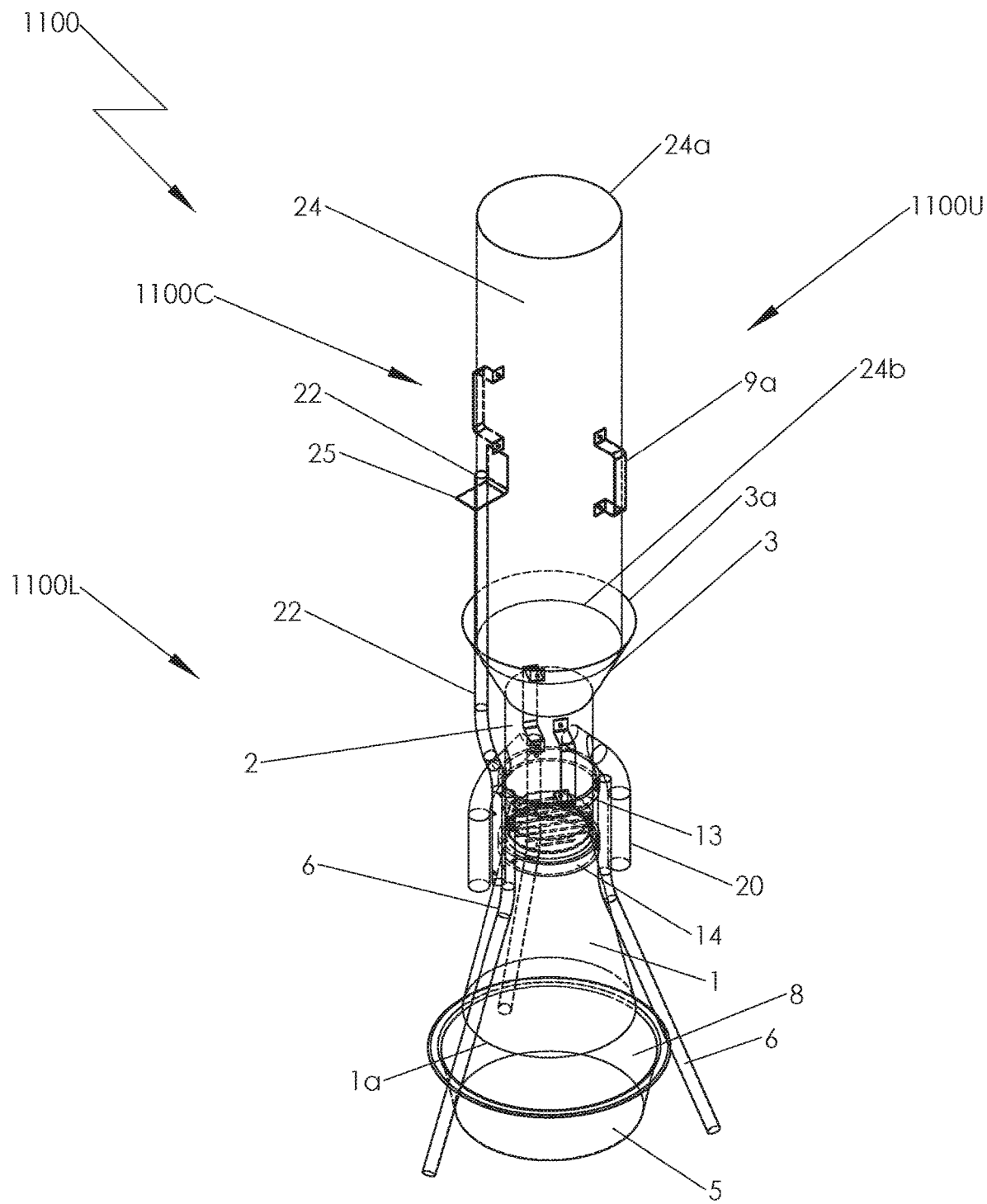
FIG. 11 is a schematic illustration of an even still another embodiment of the charcoal igniter having a venturi, wherein this embodiment includes an extended chimney stack, constructed according to the present invention.

Regarding FIG. 11, there is illustrated another embodiment of the charcoal igniter 1100. Charcoal igniter 1100, includes, in part, upper section 1100U and lower section 1100L. With respect to lower section 1100L, as shown in FIG. 11, lower section 1100L includes, in part, accelerator section 1, opening 1*a*, ash collection pan 5, a plurality of support legs 6, upper leg support 13, and lower leg support 14. It is to be understood that the various components of lower section 1100L can be constructed of any suitable, durable material such as aluminum, steel or stainless steel. It is to be further understood that the fire chamber 2, as shown in FIG. 11, is constructed of the same materials as the fire chamber 2 illustrated in FIG. 1. It is to be even further understood that except for the use of the extended chimney stack 1100C, as discussed below, charcoal igniter 1100 is constructed in substantially the same manner as charcoal igniter 1000 and operates in substantially the same manner as charcoal igniter 1000 including igniter port 7 and igniter port cap 7*a*.

With respect to upper section 1100U, upper section 1100U includes upper external air flow pipes 20. Upper external air flow pipes 20 are conventionally attached to openings in a mid-portion of the fire chamber 2 by conventional techniques such as welding or through the use of conventional fasteners. As can be seen in FIG. 11, upper external air flow pipes 20 terminate outside of the fire chamber 2. It is to be further understood that the diameters of upper external air flow pipes 20 should provide proper air flow through upper external air flow pipes 20.

Figure 12:
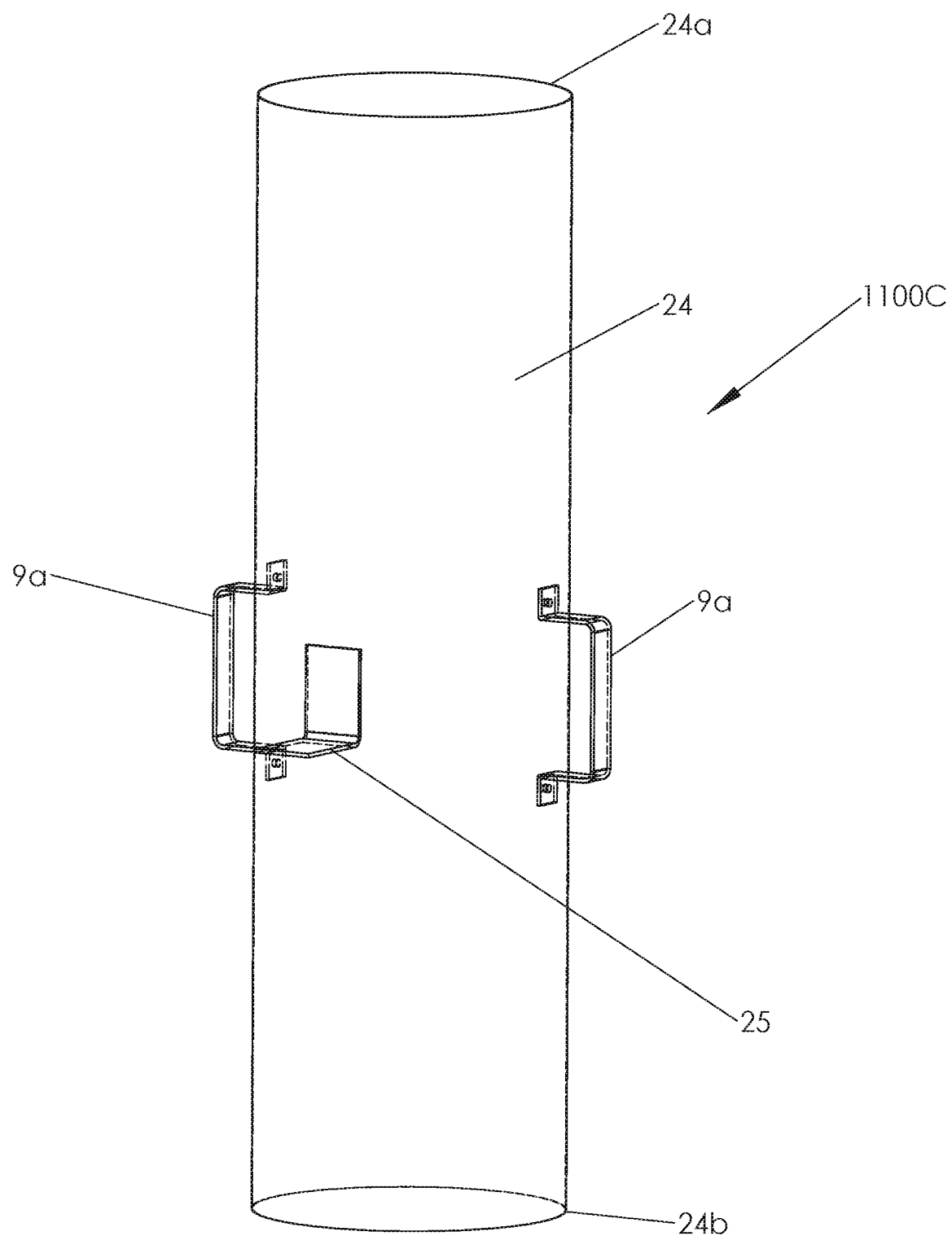
FIG. 12 is a schematic illustration of the extended chimney stack of FIG. 11, constructed according to the present invention.

Located on top of conical top section 3 is extended chimney stack 1100C. As best shown in FIG. 12, extended chimney stack 1100C includes handles 9*a*, chimney stack 24, chimney stack openings 24*a* and 24*b*, and tab 25. The purpose of extended chimney stack 1100C is to enhance the air flow draft through the utilization of a longer chimney stack 24. It is to be understood that the components of extended chimney stack 1100C can be constructed of any suitable, durable material such as aluminum, steel or stainless steel.

Regarding FIG. 11, extended chimney stack 1100C includes at least one strut 22 that is conventionally attached at one end to the upper leg support 13 and the lower leg support by conventional fasteners. The other end of strut 22 is conventionally removably attached to tab 25 by conventional removable fasteners. The purpose of strut 22 is to secure extended chimney stack 1100C to charcoal igniter 1100 so that extended chimney stack 1100C does not easily fall off of charcoal igniter 1100. Also, it is to be understood that extended chimney stack 1100C must be able to be easily removed from strut 22 at tab 25. It is to be understood that once the charcoal 10 has become ignited, extended chimney stack 1100C should be removed.

As discussed above with respect to charcoal igniter 1100, the upper external air flow pipes 20 extend into a mid-portion to an upper portion of the fire chamber 2. In this manner, air is conducted through the upper external air flow pipes 20 so that the air interacts with a mid-portion and/or an upper portion of the charcoal 10 in the fire chamber 2. In addition, due to the fact that external airflow pipes 20 terminate in the atmosphere and extend downwardly, external airflow pipes 20 create their own updraft and draw in cooler, more dense air while not disrupting airflow in the accelerator section 1. It is to be further understood that the other unique aspects of the charcoal igniters 100, 600 and 1000 such as the venturi effect and the ability to use the charcoal igniters 100, 600 and 1000 as a food cooker/heater can equally be applied to charcoal igniter 1100.

In particular, due to the fact that the volume within accelerator section 1 is greater than the volume of fire chamber 2, a net increase in the velocity of the air that passes through lower grate 4, fire chamber 2 and upper external air flow pipes 20 is created when air begins to flow through charcoal igniter 1100 once the charcoal 10 is ignited. Also, due to the fact that accelerator opening 1a is larger in diameter (or cross-section) than a diameter (or cross-section) of fire chamber 2, air velocity at lower grating 4 is increased. Further, due to the fact that charcoal 10 further restricts the open passages in fire chamber 2, the air flow increases as the air goes through the charcoal 10 in the fire chamber 2 on its way up and out of conical tip section opening 3a. In this manner, the convective hot gases flowing upward create more airflow up through accelerator opening 1a. As heat is created in fire chamber 2, an updraft is created within fire chamber 2 and upper external air flow pipes 20. The dimensions and location of fire chamber 2 create a restriction in the air flow which cause the air flow to accelerate even more through fire chamber 2 and upper external air flow pipes 20 which allows the air to be distributed over substantially the entire amount of charcoal 10 located within fire chamber 2 thereby encouraging a quicker and more efficient complete ignition of the charcoal 10.

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawing, which are to be considered part of the entire written description. In the description, relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

All patents, publications, scientific articles, web sites, and other documents and materials referenced or mentioned herein are indicative of the levels of skill of those skilled in the art to which the invention pertains, and each such referenced document and material is hereby incorporated by reference to the same extent as if it had been incorporated by reference in its entirety individually or set forth herein in its entirety. Applicants reserve the right to physically incorporate into this specification any and all materials and information from any such patents, publications, scientific articles, web sites, electronically available information, and other referenced materials or documents to the extent such incorporated materials and information are not inconsistent with the description herein.

The written description portion of this patent includes all claims. Furthermore, all claims, including all original claims as well as all claims from any and all priority documents, are hereby incorporated by reference in their entirety into the written description portion of the specification, and Applicant(s) reserve the right to physically incorporate into the written description or any other portion of the application, any and all such claims. Thus, for example, under no circumstances may the patent be interpreted as allegedly not providing a written description for a claim on the assertion that the precise wording of the claim is not set forth in haec verba in written description portion of the patent.

The claims will be interpreted according to law. However, and notwithstanding the alleged or perceived ease or difficulty of interpreting any claim or portion thereof, under no circumstances may any adjustment or amendment of a claim or any portion thereof during prosecution of the application or applications leading to this patent be interpreted as having forfeited any right to any and all equivalents thereof that do not form a part of the prior art.

All of the features disclosed in this specification may be combined in any combination. Thus, unless expressly stated otherwise, each feature disclosed is only an example of a generic series of equivalent or similar features.

It is to be understood that while the invention has been described in conjunction with the detailed description thereof, the foregoing description is intended to illustrate and not limit the scope of the invention, which is defined by the scope of the appended claims. Thus, from the foregoing, it will be appreciated that, although specific embodiments of the invention have been described herein for the purpose of illustration, various modifications may be made without deviating from the spirit and scope of the invention. Other aspects, advantages, and modifications are within the scope of the following claims and the present invention is not limited except as by the appended claims.

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. Thus, for example, in each instance herein, in embodiments or examples of the present invention, the terms "comprising", "including", "containing", etc. are to be read expansively and without limitation. The methods and processes illustratively described herein suitably may be practiced in differing orders of steps, and that they are not necessarily restricted to the orders of steps indicated herein or in the claims.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by various embodiments and/or preferred embodiments and optional features, any and all modifications and variations of the concepts herein disclosed that may be resorted to by those skilled in the art are considered to be within the scope of this invention as defined by the appended claims.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

It is also to be understood that as used herein and in the appended claims, the singular forms "a," "an," and "the" include plural reference unless the context clearly dictates otherwise, the term "X and/or Y" means "X" or "Y" or both "X" and "Y", and the letter "s" following a noun designates both the plural and singular forms of that noun. In addition, where features or aspects of the invention are described in terms of Markush groups, it is intended and those skilled in the art will recognize, that the invention embraces and is also thereby described in terms of any individual member or subgroup of members of the Markush group.

Other embodiments are within the following claims. Therefore, the patent may not be interpreted to be limited to the specific examples or embodiments or methods specifically and/or expressly disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

Other modifications and implementations will occur to those skilled in the art without departing from the spirit and the scope of the invention as claimed. Accordingly, the description hereinabove is not intended to limit the invention, except as indicated in the appended claims.

Therefore, provided herein are a new and improved charcoal igniter having a venturi effect. The preferred charcoal igniter having a venturi effect, according to various embodiments of the present invention, offers the following advantages: ease of use of the charcoal igniter; excellent charcoal ignition capabilities; the ability to use the charcoal igniter as a food cooker; the ability to provide air substantially throughout the entire amount of charcoal in the igniter; lightness in weight; excellent durability; portability; and reduced cost. In fact, in many of the preferred embodiments, these advantages of ease of use, excellent charcoal ignition capabilities, the ability to use the charcoal igniter as a food cooker, the ability to provide air substantially throughout the entire amount of charcoal in the igniter, lightness in weight, durability, portability, and reduced cost are optimized to an extent that is considerably higher than heretofore achieved in prior, known charcoal igniters.

I claim:

1. A charcoal igniter, comprising:
a removable upper section such that the removable upper section includes a first conical section having a distal end and a proximal end such that the proximal end of the first conical section includes a first conical section opening, a fire chamber having a distal end and a proximal end such that a grating is located adjacent to the distal end of the fire chamber and the distal end of the first conical section is located adjacent to the proximal end of the fire chamber, wherein the first conical section opening has a diameter greater than a diameter of the fire chamber; wherein the removable upper section is further comprised of: at least one upper external air flow pipe having a distal end and a proximal end such that the proximal end of the at least one upper external air flow pipe is operatively attached to the removable upper section; wherein the distal end of the at least one upper external air flow pipe is outside the fire chamber; and the at least one upper external air flow pipe extends into the fire chamber and extends into a portion of an amount of charcoal to be ignited; and
a stationary lower section such that the removable upper section is retained within the stationary lower section and the removable upper section can be removed from the stationary lower section, wherein the stationary lower section includes a plurality of supporting legs, and a second conical section having a distal end and a proximal end such that the proximal end of the second conical section is located adjacent to the removable upper section and the distal end of the second conical section includes a second conical section opening, wherein the second conical opening has a diameter that is larger than a diameter of the fire chamber, wherein the stationary lower section is further comprised of:
at least one lower external air flow pipe having a distal end and a proximal end such that the distal end of the at least one lower external air flow pipe is operatively attached to the second conical section and the proximal end of the at least one lower external air flow pipe is operatively connected to the distal ends of the at least one upper external air flow pipe such that air flow is drawn through the second conical section.

2. The charcoal igniter, according to claim 1, wherein the charcoal igniter is further comprised of:
at least one air flow introducer located on the inside of the fire chamber such that the air flow introducer includes a plurality of air flow risers such that each air flow riser includes a distal end and a proximal end such that the proximal end of each air flow riser is operatively attached to the grating and the distal end of each air flow riser includes an opening; an air infusion pipe operatively connected between the plurality of air flow risers; and a plurality of air flow risers extends into the fire chamber and extends into a portion of an amount of charcoal to be ignited.

3. The charcoal igniter, according to claim 2, wherein the air infusion pipe is further comprised of: at least one hole located along a length of the air infusion pipe.

4. The charcoal igniter, according to claim 1, wherein the removable upper section is further comprised of:
an ignition port having a proximal end and a distal end such that the proximal end of the ignition port is located adjacent to the grating and the distal end of the ignition port includes an ignition port cap.

5. The charcoal igniter, according to claim 1, wherein the stationary lower section is further comprised of:
an upper leg support; and a lower leg support; and a plurality of supporting legs, wherein the upper leg support and the lower leg support are operatively connected to the plurality of supporting legs.

6. The charcoal igniter of claim 1 further comprising:
an elongated chimney conduit positioned substantially vertically, having a first open end and a second open end, wherein the first open end is attached to the proximal end of the first conical section, and the second open end is opened to the atmosphere to allow fumes created in the fire chamber to flow through the chimney conduit and out of the second end creating an upward draft.

7. A charcoal igniter and food cooker, comprising:
a removable upper section such that the removable upper section includes a first conical section having a distal end and a proximal end such that the proximal end of the first conical section includes a first conical section opening, a first removable grating resting over the proximate end of the first conical section, a fire chamber having a proximal end and a distal end such that the distal end of the first conical section is located adjacent to the proximal end of the fire chamber, wherein the first conical section opening has a diameter greater than a diameter of the fire chamber, and a second grating located at a distal end of the fire chamber, and at least one air flow introducer operatively connected to the second grating and extending into a portion of the charcoal to be ignited inside the fire chamber, wherein the air flow introducer includes a plurality of air flow risers such that each air flow riser includes a distal end and a proximal end such that the proximal end of each air flow riser is operatively attached to the second grating and the distal end of each air flow riser includes an opening; an air infusion pipe located partially inside the fire chamber operatively connected between the plurality of air flow risers; and the plurality of air flow risers extends into the fire chamber and extends into a portion of an amount of charcoal to be ignited; and
a stationary lower section such that the removable upper section is retained within the stationary lower section and the removable upper section can be removed from the stationary lower section, wherein the stationary lower section includes a plurality of supporting legs, and a second conical section having a distal end and a proximal end such that the proximal end of the second conical section is located adjacent to the removable upper section and the distal end of the second conical section includes a second conical section opening, wherein the second conical opening has a diameter that is larger than a diameter of the fire chamber.

8. The charcoal igniter, according to claim 7, wherein the air infusion pipe is further comprised of:
at least one hole located along a length of the air infusion pipe.

9. The charcoal igniter, according to claim 7, wherein the removable upper section is further comprised of:
at least one upper external air flow pipe having a distal end and a proximal end such that the proximal end of the at least one upper external air flow pipe is operatively attached to the removable upper section, and the at least one upper external air flow pipe extends into the fire chamber and extends into a portion of an amount of charcoal to be ignited.

10. The charcoal igniter, according to claim 9, wherein the stationary lower section is further comprised of:
at least one lower external air flow pipe having a distal end and a proximal end such that the distal end of the at least one lower external air flow pipe is operatively attached to the second conical section and the proximal end of the at least one lower external air flow pipe is operatively connected to the distal end of the at least one upper external air flow pipe.

11. The charcoal igniter, according to claim 7, wherein the removable upper section is further comprised of:
an ignition port having a proximal end and a distal end such that the proximal end of the ignition port is located adjacent to the second grating and the distal end of the ignition port includes an ignition port cap.

12. The charcoal igniter, according to claim 7, wherein the stationary lower section is further comprised of:
an upper leg support; and a lower leg support; and a plurality of supporting legs, wherein the upper leg support and the lower leg support are operatively connected to the plurality of supporting legs.

* * * * *